United States Patent [19]
Nichols, II

[11] Patent Number: 5,961,139
[45] Date of Patent: Oct. 5, 1999

[54] BEACH LANDING VEHICLE FOR WATERCRAFT

[76] Inventor: Raymond Nichols, II, 3725 Eveningside Dr., Cleveland, Tenn. 37312

[21] Appl. No.: 08/863,816

[22] Filed: May 27, 1997

[51] Int. Cl.⁶ .................................................. B60P 3/10
[52] U.S. Cl. ......................................... 280/414.1; 114/344
[58] Field of Search .............................. 280/414.1, 414.2; 114/344

[56] References Cited

U.S. PATENT DOCUMENTS

| | | | |
|---|---|---|---|
| 2,442,071 | 5/1948 | Bunten | 280/414.1 |
| 2,478,795 | 8/1949 | Whalen et al. | 280/414.1 |
| 2,585,664 | 2/1952 | Le May et al. | 114/344 |
| 3,403,798 | 10/1968 | Flachbarth et al. | 280/414.1 |
| 3,579,996 | 5/1971 | Edson | 114/344 |
| 4,260,282 | 4/1981 | Dorsey et al. | 280/414.1 |
| 4,505,619 | 3/1985 | Sargent | 114/344 |
| 4,696,250 | 9/1987 | Antonides | 114/344 |
| 4,779,888 | 10/1988 | Raymond | 280/414.1 |
| 5,255,933 | 10/1993 | Carrick | 280/414.1 |
| 5,417,447 | 5/1995 | Godbersen | 280/414.1 |
| 5,806,871 | 9/1998 | Eggleston | 280/414.1 |

*Primary Examiner*—Kevin Hurley
*Attorney, Agent, or Firm*—Paul E. Hodges, Esq.

[57] ABSTRACT

A hand manipulatable vehicle for use in the beaching of a watercraft and for stabilizing the beached watercraft against lateral movement of the aft end thereof while beached. The vehicle includes a lightweight frame which provides support for a pair of spaced apart runners that are adapted to receive the bow of a watercraft thereon and to support the bow of the watercraft off the beach or the bottom of the body of water. Preferably the vehicle includes wheels at one end thereof and a handle at its opposite end for ready and easy movement and positioning of the vehicle. A "four point" anchoring of the vehicle in the beach or bottom of the body of water is provided by the wheels and by posts provided on that end of the vehicle opposite the location of the wheels. This anchoring of the vehicle and the elongated nature of the runners further stabilize the beached watercraft against lateral movement of the aft end of the watercraft and against tilting of the beached watercraft during embarkation and disembarkation maneuvers. Transportation of the vehicle to and from a body of water may be via a common watercraft trailer.

4 Claims, 2 Drawing Sheets

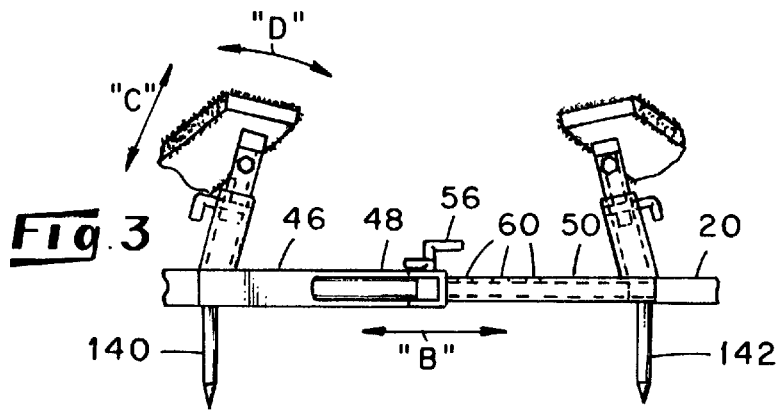
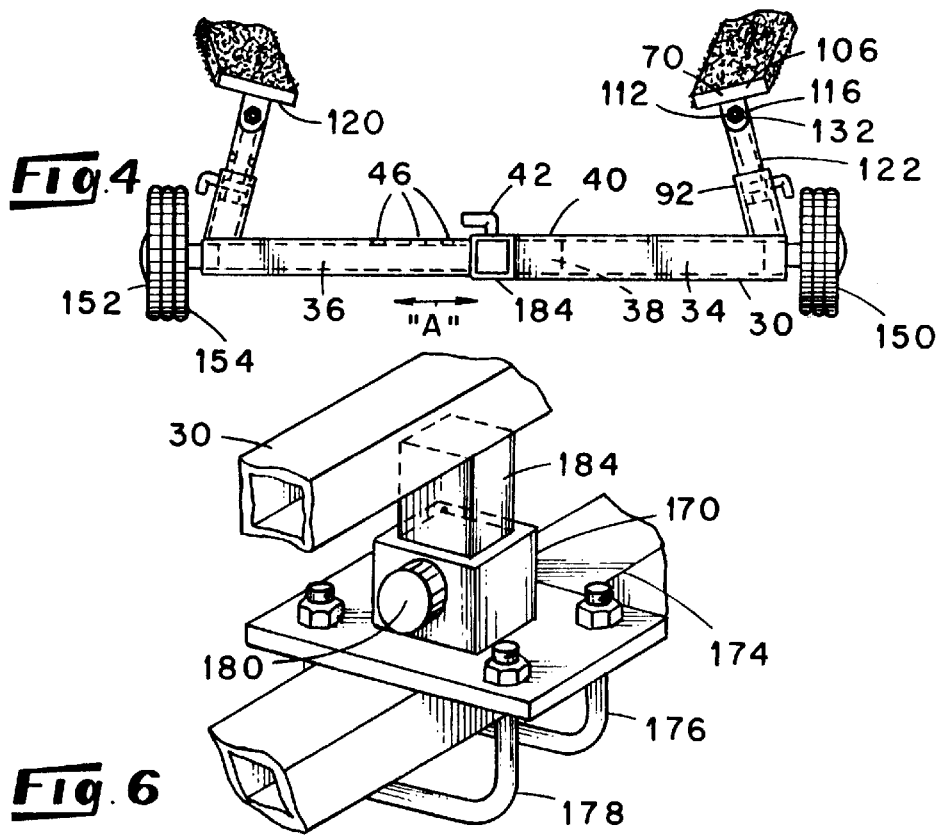
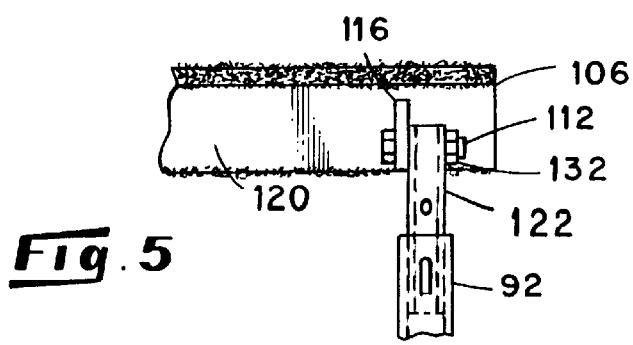

BEACH LANDING VEHICLE FOR WATERCRAFT

FIELD OF INVENTION

This invention relates to devices for use in the landing of watercraft on beaches. The watercraft may be a boat or other personnel conveyance adapted to float and be propelled over the surface of a body of water.

BACKGROUND OF INVENTION

Watercraft, such as the common pleasure boat, water ski mobile, and similar vehicles adapted to float and convey personnel over the surface of a body of water, are particularly common on inland lakes, rivers and costal areas. After a period of time of use of the watercraft, it is common to beach the watercraft during which time the occupants may enjoy a swim, picnic on the beach, or just lounge in the sun. Beaching of a watercraft on a beach is hazardous to the watercraft from several aspects. First, if the bow of the watercraft is run upon the beach, there is a likelihood that the bow may contact abrasive objects, resulting in deterioration of the surface finish of the bow, and in more serious situations, physical damage to the bow in the form of deep scratches, gouges, or even punctures in the hull of the watercraft. This problem is exacerbated by the commonly rock-strewn beaches of inland lakes and rivers. Second, after the watercraft has been run upon the beach, there remains the problem of preventing the aft end of the watercraft from swinging to the left or right and into the shoreline or beach, again resulting in possible undesirable damage to the watercraft. Not uncommonly, many forms of pleasure watercraft in today's market cost many thousands of dollars so that protection of the watercraft from damage is of importance.

SUMMARY OF INVENTION

In accordance with one aspect of the present invention there is provided a device for assisting in the beaching of a watercraft in an attitude wherein the watercraft is both protected from the beach and is stabilized against lateral movement of the aft end of the watercraft while beached. In the depicted embodiment, the present device includes a wheeled vehicle having a rear set of wheels and a front handle adapted to be grasped in the hand of a user. Side runners extend from the front to the rear of the vehicle along the opposite sides of the vehicle. As depicted, the rear ends of the two runners are adjustable with respect to their lateral spacing. In like manner, the lateral spacing of the front ends of the runners is adjustable. In a preferred embodiment, the front ends of the runners are more closely spaced to one another than are the rear ends of the runners so that the runners form an open "V" structure into which the keel of a watercraft may be received. Each runner preferably is mounted at each of its front and rear ends such that the runner is selectively rotatable about its longitudinal axis and tiltable from its front to its rear ends. The vehicle further is provided with at least one downwardly directed post which is adapted to become embedded in the beach to anchor the vehicle from movement away from the beach once the vehicle is initially positioned relative to the shoreline.

In use, the vehicle is hand drawn to the shoreline and the rear end of the vehicle is wheeled into the water near the shoreline to the extent that approximately one-half the length of each runner is submerged beneath the surface of the water. Thereupon, relatively slight vertical force is applied to the front end of the vehicle to partly embed the post into the beach adjacent the shoreline, and preferably within the body of water. Thereafter, the watercraft may be driven onto the vehicle with the bow of the watercraft engaging the top side of the runners. As the bow of the watercraft moves along the runners, the vehicle is further embedded within the beach or bottom of the body of water, and the bow of the watercraft is partially lifted out of the water to cause the watercraft to become stabilized with respect to the runners of the vehicle. In this manner, the watercraft and the vehicle act in concert to resist lateral movement of the aft end of the watercraft. This lateral stability is particularly important under windy conditions and/or when there are other watercraft operating in the area and which are generating waves which move toward the beach.

The runners of the present vehicle include respective top surfaces which as provided with a covering of a material which is non-abrasive so that there is no abrasive damage to the bow of the watercraft.

When it is desired to resume operation of the watercraft, it is only necessary to reverse the thrust of the power train of the watercraft to withdraw the bow of the watercraft from the runners, leaving the beaching vehicle in position for subsequent beaching of the same or another watercraft.

BRIEF DESCRIPTION OF FIGURES

It is an object of the present invention to provide a hand maneuverable vehicle suitable for use as an aid in the beaching of a watercraft.

It is another object to provide a watercraft beaching vehicle which provides stabilization of the beached watercraft against lateral movement of the aft end of the watercraft.

Figure 2:
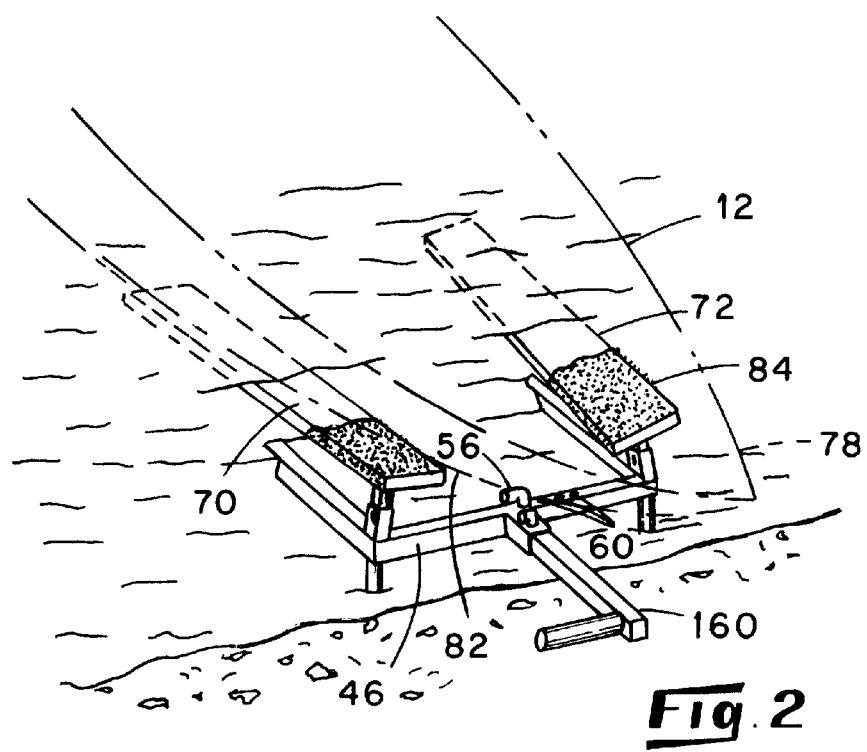
Figure 1:
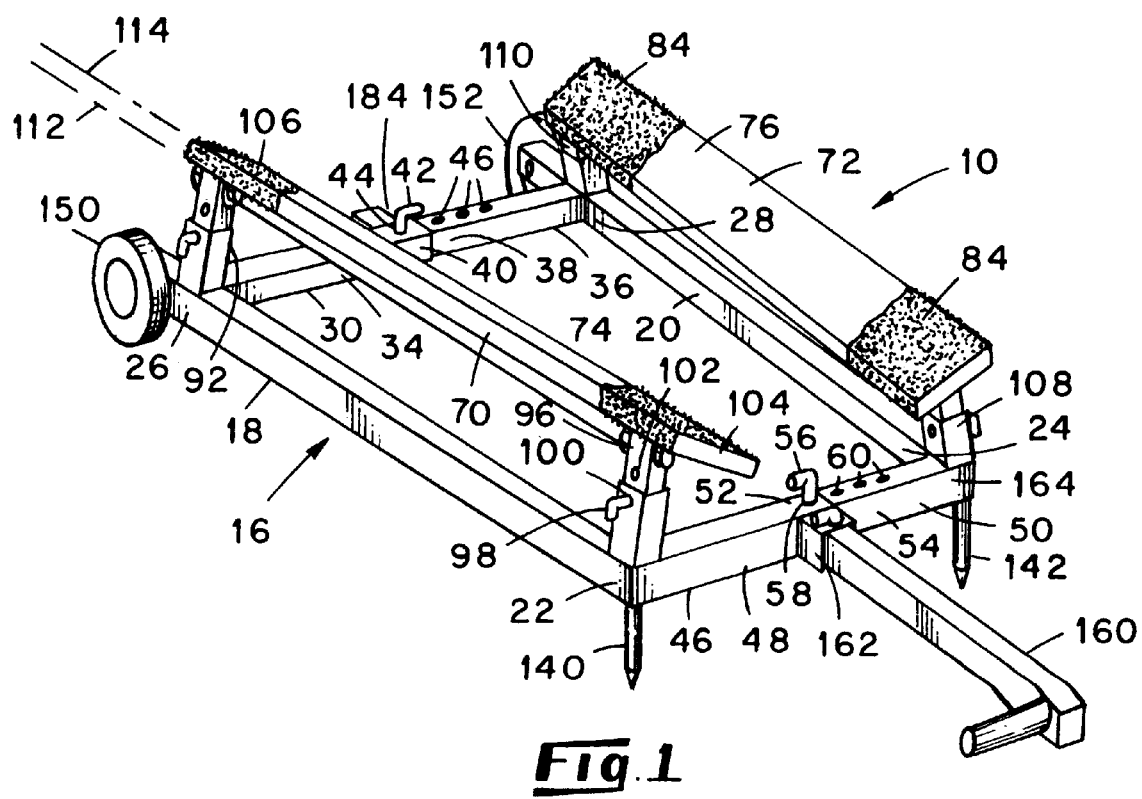

Other objects and advantages of the present invention will be recognized from the present description, including the claims and the figures in which:

FIG. 1 is a perspective view of a watercraft beaching device embodying various of the features of the present invention;

FIG. 2 is a further perspective view depicting the watercraft of FIG. 1 as deployed adjacent a shoreline in position to receive the bow of a watercraft thereupon;

FIG. 3 is a front plan view of the watercraft depicted in FIG. 1;

FIG. 4 is a rear plan view of the watercraft depicted in FIG. 1;

FIG. 5 is a fragmentary side view of one embodiment of a mounting for an end of a runner of the vehicle of the present invention; and, FIG. 6 is a perspective view of apparatus for use in the removable mounting of a watercraft of the present invention on a trailing vehicle and depicting a portion of a structural member of the trailering vehicle.

DETAILED DESCRIPTION OF INVENTION

With reference to the several Figures, there is depicted one embodiment of a beach landing device 10 for watercraft 12 (depicted in phantom in FIG. 2). In the depicted embodiment, the device 10 includes a structural frame 16 that includes first and second side beams 18 and 20, including respective front ends 22 and 24, and respective rear ends 26 and 28. The rear ends 26 and 28 of the side beams are connected in rigid relationship to one another as by a rear cross beam 30 that extends therebetween. Preferably the rear cross beam 30 is formed of two sections 34 and 36, the inboard end 38 of the section 36 being telescopically received in the facing inboard end 40 of the other section 34. Pin means 42 is received in a throughbore 44 in the end 40 of the section 34 and a selected one of a plurality of spaced apart throughbores 46 in the end 38 of the section 36 so that the length of the rear cross beam may be selectively adjusted as indicated by the arrow "A" of Figure . In this manner, the spatial distance of separation of the rear ends 26 and 28 of the side beams 18 and 20 may be selected within the limits provided by the permissible lengths of the rear cross beam.

In similar manner, the front ends 22 and 24 of the side beams 18 and 20 are connected in rigid relationship to one another by a front cross beam 46 that extends therebetween. Preferably the front cross bean 46 is formed of first and second sections 48 and 50, the inboard end 54 of the second section 50 being telescopically received within the inboard end 52 of the first section 48. Pin means 56 received in a throughbore 58 in the end 52 of the first section 48 and in a selected one of a plurality of throughbores 60 in the end 54 of the second section 50 provides for selective adjustability of the length of the front cross beam 46, hence limited selection of the spatial separation distance between the side beams 18 and 20 at their front ends 22 and 24 (See arrow "B" of FIG. 3).

With particular reference to FIGS. 1–4, the depicted vehicle of the present invention further includes first and second elongated, generally planar runners 70 and 72. The runners include respective flat upper surfaces 74 and 76 which are adapted to slidably receive thereon the bow 78 of a watercraft 12 with the runners being disposed on opposite sides of the keel 82 of the watercraft (see FIG. 2). Each runner is depicted as being provided with a surface covering 84, such as carpeting, that is non-abrasive to the outer surface of the watercraft. Alternatively, each runner may be provided with a layer of non-abrasive material, such as a plastic, or may be formed of a plastic material that is non-abrasive to the outer surface of the watercraft.

In a preferred embodiment, each runner is mounted in an elevated position above a respective side beam. This mounting may take the form of upright standards 90 and 92 which are rigidly secured to opposite ends 22 and 26 of the side beam 18, for mounting the runner 70. Preferably, each standard, standard 90 for example, is formed in two sections 94 and 96, with the second section 96 being telescopically received within the first section 94 and secured by a pin means 98 that is received in a throughbore 100 in the first section and a registering one of a plurality of throughbores 102 in the second section 96. By this means, the vertical height of the front end 104 of the runner 70 above the side beam 18 may be selectively adjusted as indicated by the arrow "C" of FIG. 3. As depicted, the rear end 106 of the runner 70 is also mounted above the side beam 18 by a standard 92 that is also adjustable in vertical height to provide for selective vertical height adjustment of the rear end 106 of the runner 70 above the side beam 18. In a preferred embodiment, the vertical height of the rear end 106 of the runner 70 above the side beam 18 is selected to be less than the vertical height above the side beam 18 than the vertical height of the front end 104 of the runner 70 so as to present an upwardly inclined top surface 74 of the runner 70 to a watercraft which is being run onto the vehicle 10. The second runner 72 is similarly mounted above its respective side beam 20 as by vertically adjustable upright standards 108 and 110.

In a preferred embodiment, the connection between the end of a runner and its respective upstanding standard includes means for limited rotational adjustment of the runner about an axis 112 that is substantially parallel to, but spaced apart from the longitudinal centerline of the runner, (centerline 114, for example) (See arrow "D" of FIG. 3). As depicted, this means for rotational mounting of the runners is provided at each end of each runner. A typical connection is that depicted at the rear end 106 of the runner 70. Referring to FIGS. 1 and 5 specifically, a typical such connection includes a lug 116 that is secured to the bottom surface 120 of the rear end 106 of the runner 70 and which projects downwardly along one side 122 of the standard 92. The lug 116 includes a throughbore 126 which is in register with a throughbore 130 provided in the standard 92. Bolt means 132 extending through the registered throughbores provides a pivotal connection between the lug and the standard so that the runner can be rotatably adjusted about the pivotal axis 112 of the bolt means 132. Like functioning pivotal connection between the other ends of the runners to their respective standards are depicted in the Figures.

Anchoring of the vehicle 10 in the bottom of a body of water or on the beach is accomplished in the depicted embodiment by means of first and second posts 140 and 142 which extend downwardly from the front ends 22 and 24 of the side beams 18 and 20. As desired, the outboard ends 144 and 146 of the posts may be sharpened to enhance their penetration into the bottom of the body of water or the beach. Further, in a preferred embodiment, the structural frame of the vehicle is mounted on a pair of wheels 150 and 152 that are axeled to the rear ends 26 and 28 of the side beams 18 and 20, respectively. Preferably each wheel is of relatively narrow width and is provided with gripping lugs 154 on its outer circumferential surface to enhance the engagement of each wheel with the bottom of the body of water.

Hand manipulation of the vehicle, in the depicted embodiment, is provided for by means of an extensible handle 160 which is telescopically received within a tubular receiver 162 that is fixedly attached to the front side 164 of the front cross beam 46. Pin means 166 provided within registered throughbores (not shown) in the receiver and the handle supplies releasable fixation of the handle within the receiver. For storage, the handle is slid further into the receiver. In use, the handle is extended as depicted in the several Figures.

Transport of the vehicle to and from a body of water is provided for in one embodiment by means of a tubular receiver 170 which is adapted to be securely mounted on a frame member 172 of a common watercraft trailer as by means of a plate 174 to which the receiver is secured and a pair of "U" bolts 176 and 178. A locking screw 180 is threadably mounted in a wall 182 of the receiver. As seen in FIGS. 1 and 4, the rear cross beam 30 of the vehicle is provided with a lug 184 which projects rearwardly from the cross beam and which is of an outer geometry complementary to the inner geometry of the receiver 170 and further is adapted to be received snugly within the receiver 170. Once the lug 184 is disposed within the receiver 170, the locking screw is tightened to lock the lug within the receiver. This arrangement provides for the vehicle to be disposed on the trailer frame in an upright position as is depicted in FIG. 6.

In use, the vehicle of the present invention is removed from its transport position on a watercraft trailer, for example, the handle 160 is extended, and the vehicle is wheeled to the shoreline by the user grasping the handle and either pushing or pulling the vehicle over the ground to the shoreline. At the shoreline, and while the operator is standing on the beach out of the water, the rear end of the vehicle is pushed into the water, preferably to a depth wherein about one-half the length of the runners is immersed beneath the surface of the water. Thereupon the front end of the vehicle is pushed downwardly to push the posts 140 and 142 into the bottom of the body of water. This action fixedly positions the vehicle for receiving the bow of a watercraft on the runners 70 and 72. Thereafter, the watercraft is run up on the vehicle with the bow of the watercraft moving equilaterally between the runners until the bottom of the watercraft solidly engages the runners and become supported off the beach or bottom of the body of water by the runners. The remainder of the watercraft continues to float in the water. This action causes the vehicle to assume a portion of the weight of the watercraft and further embeds the vehicle in the bottom of the body of water. Both the posts and the wheels of the vehicle tend to become embedded in the relatively soft bottom of the body of water, thereby preventing the vehicle from shifting in any direction relative to the bottom of the body of water. This anchoring of the vehicle is enhanced by the presence of the watercraft on the runners.

It will be recognized from FIG. 1 that when the watercraft is positioned on the runners of the vehicle, the bow of the watercraft is disposed over the beach such that a rider in the watercraft may disembark onto the beach without entering the water. Reentry of the watercraft is likewise a simple and dry maneuver. When a watercraft is disposed on the vehicle of the present invention, the "four point" anchoring of the vehicle in the bottom of the body of water further serves to stabilize the watercraft against tilting when a user steps on the port or starboard side of the watercraft during embarkation or disembarkation to and from the watercraft.

Importantly, once the watercraft is on the runners, the aft end of the watercraft, which is floating in the water, is prevented from swinging laterally of the vehicle and toward the beach in either a left or right direction. This is due to the resistance to rotation of the watercraft relative to the vehicle by the elongated runners. In a typical embodiment for a watercraft of less than about 20 feet in length, a runner length of about three feet has been found sufficient to stabilize the watercraft against lateral movement of the aft end of the watercraft when the watercraft is docked on the vehicle. When it is desired to withdraw the watercraft from the vehicle, it is only necessary to reverse the driving thrust for the watercraft to cause the watercraft to readily withdraw from the vehicle. The vehicle remains firmly embedded in the body of water and in position for the same or another watercraft to be received thereon. At the end of a day's activities on the water, for example, the vehicle is readily removed from the water by grasping the handle and lifting and pulling the vehicle from the water. For transport, the vehicle is positioned in an upright attitude with the lug 184 inserted in the receiver 170 on the trailer and locked in this position by means of the locking screw 180.

Whereas the present invention has been described in specific terms and embodiments, it is to be recognized that a person skilled in the art will recognize acceptable variations of the structure of the vehicle and it is intended that the invention be limited only in accordance with the claims appended hereto.

What is claimed:

1. A vehicle for receiving thereon the bow end of a watercraft for beaching the watercraft on the beach or adjacent the shoreline of a body of water comprising a frame adapted to receive thereon components of the vehicle, said frame including an elongated front member having first and second opposite ends and extending transversely of the vehicle and defining the front end of the vehicle, a rear member extending transversely of the vehicle and defining the rear end of the vehicle, and opposite side members extending longitudinally of the vehicle between said front member and said rear member along opposite sides of the vehicle, first and second elongated runners which are substantially coextensive in length with said side members mounted along and elevated above said side members and extending from proximate said front member to proximate said rear member, each of said runners including a front end, a rear end and a top surface suitable for sliding receipt of the bow of a watercraft thereon without deleterious effect upon the watercraft, means mounting each of said runners in their elevated positions above their respective side member, at least first and second rigid posts fixedly mounted on and depending from said frame at respective locations adjacent the junction of a respective side member with said first and second ends, respectively, of said front member of said frame and adapted to be at least partially embedded in the beach or in the bottom of the body of water adjacent the shoreline thereof to aid in stabilizing said vehicle against movement relative to the beach or bottom of the body of water adjacent the shoreline, and means depending from each of said side members adjacent the rear end of the vehicle and adapted to be at least partially embedded in the beach or in the bottom of the body of water adjacent the shoreline thereof to further aid in stabilizing said vehicle against movement relative to the beach or bottom of the body of water adjacent the shoreline , said means depending from said front member of said frame and said means depending from said side members adjacent the rear ends thereof defining a four-point anchoring of said vehicle to the beach or bottom of the body of water whereby said vehicle resists movement in all directions laterally away from its anchored position.

2. The vehicle of claim 1 wherein each of said front member and said rear member of said frame comprises first and second elongated portions, one of which is telescopically received within the other, and including means for selectively adjusting the length of each of said front member and said rear member whereby the width of the vehicle may vary between its front end and its rear end.

3. The vehicle of claim 1 wherein said means depending from said rear end of said vehicle comprises first and second wheel means, each of said wheel means being axeled from a side member adjacent the end of said vehicle.

4. The vehicle of claim 1 wherein said means for mounting said runners elevated above respective side members includes pivot means disposed adjacent the front and rear ends of a runner and defining a pivot axis that is spaced apart from and substantially parallel to the longitudinal axis of the runner and providing for rotational adjustability of the runner about said pivot axis.

* * * * *